(No Model.)   2 Sheets—Sheet 1.
J. McA. PALMER.
WAVE POWER.
No. 597,832.   Patented Jan. 25, 1898.
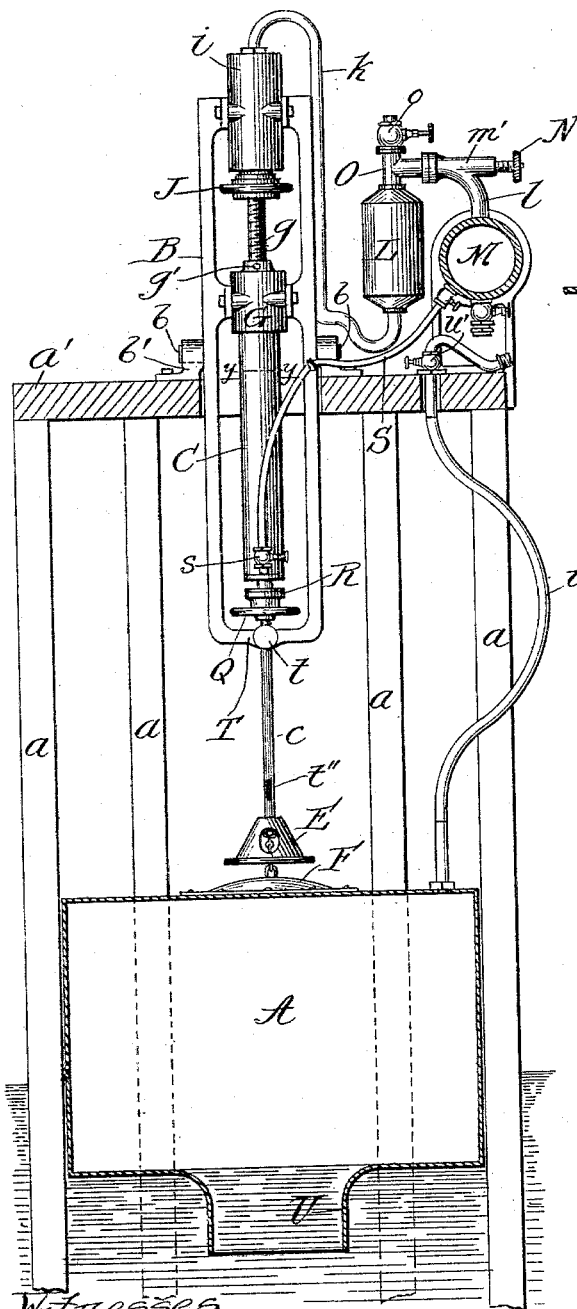
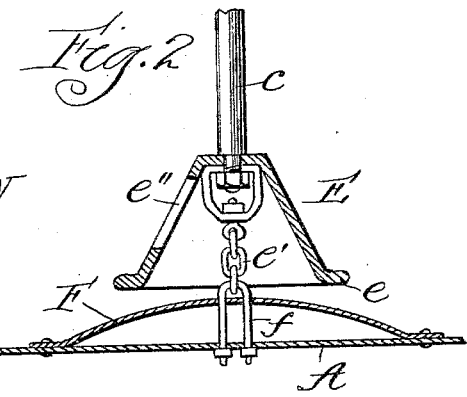
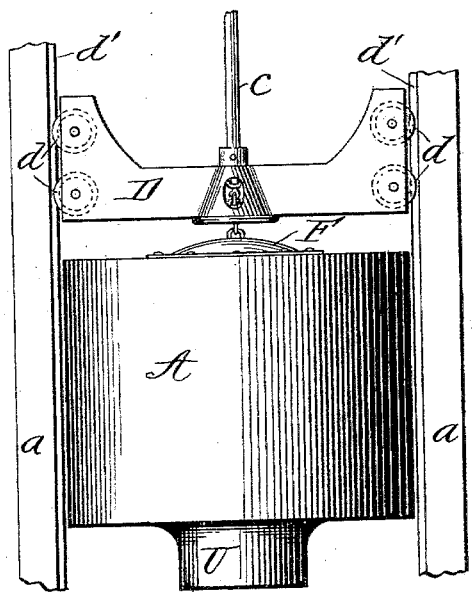
Witnesses
Inventor
John McA. Palmer.
Raymond & Anshurder
Attys (No Model.) 2 Sheets—Sheet 2.
J. McA. PALMER.
WAVE POWER.
No. 597,832. Patented Jan. 25, 1898.

UNITED STATES PATENT OFFICE.

JOHN McAULEY PALMER, OF FORT GRANT, ARIZONA TERRITORY.

WAVE-POWER.

SPECIFICATION forming part of Letters Patent No. 597,832, dated January 25, 1898.

Application filed April 22, 1897. Serial No. 633,378. (No model.)

*To all whom it may concern:*

Be it known that I, JOHN MCAULEY PALMER, a citizen of the United States, residing at Fort Grant, in the county of Graham and Territory of Arizona, have invented certain new and useful Improvements in Wave-Powers, of which the following is a full, clear, and exact description, reference being had to the accompanying drawings, forming a part of this specification.

My invention relates to certain new and useful improvements in wave-powers; and its object is to utilize the vertical energy of oscillatory waves to obtain power for useful purposes.

I use the term "oscillatory" waves to indicate those waves that run in water of sufficient depth to permit their free propagation. Waves of a given height will continue to be oscillatory until they strike sufficiently-shoal water, and, generally speaking, it may be said that so long as the water is twice as deep as the height of the wave the wave will be oscillatory and have a tendency to move a float in a vertical direction; but while this is the case the motion of such waves is very irregular, and in a series of waves it is quite probable that no two of them will reach the same height. If the strokes of the waves were uniform, a float would rise and fall with great regularity; but, as a matter of fact, we know that they are far from being uniform, and some mechanism must be employed to provide for this irregular motion.

Another object of my invention, therefore, is to provide a motor which will utilize the energy of waves of various heights; and further objects of my invention are to provide means for adjusting the mechanism for waves of different average heights, to regulate or maintain the working pressure of the wave-motor at substantially a constant pressure, to provide means for stopping the motor and throwing the same out of gear, to mount the mechanism of the motor in such a manner that it may be readily moved to a secure position when danger is threatened by reason of gales or storms, and to provide a float which can be readily submerged during storms and means for coupling the float with the operative mechanism. With these and other ends in view I have shown my improved motor in the accompanying drawings, in which—

Figure 1 is a side elevation of a wave-motor, partly in section, embodying my improvements. Fig. 2 is a sectional view showing the coupling between the motor piston-rod and the float. Fig. 3 illustrates means for strengthening the piston-rod and protecting it from the wrench due to lateral oscillation. Fig. 4 is a vertical central sectional view showing the construction of the operative mechanism of the motor. Fig. 5 is a sectional view showing the mechanism for stopping the motor and throwing the same out of gear. Fig. 6 illustrates the air-pressure chamber, showing the regulating-valve in section.

In the drawings I have illustrated my machine as it is constructed for the purpose of compressing air, the compressed air being conveyed through a conduit or air-receiver to convenient places for use; but it is obvious to those skilled in the art that this invention may be used for other purposes than compressing air.

Referring to the drawings, in which like letters of reference denote corresponding parts in all of the figures, A designates a float, which may be cylindrical or of any other shape desired and of suitable size, being confined by the piles $a$, which are surmounted by a platform $a'$.

The air-compressing mechanism is arranged and mounted within a revoluble frame B, said frame being balanced on trunnions $b$, which rest in the trunnion-beds $b'$, mounted on the platform $a'$. When the machine is in operation, this frame is secured by some suitable means in a vertical position, but during storms or gales or high seas when it is desired to throw the apparatus out of gear, the float being first uncoupled from the mechanism, this frame may be turned into a horizontal position, thereby bringing the air-compressing mechanism into a safe position removed from the power of the waves.

An air-compressing cylinder C is secured within the frame B, and a piston-rod $c$ operates in this cylinder and is coupled at its lower end to the float and carries a pressure-piston $c'$ at its upper end. For the purpose of guiding this piston-rod and protecting it from the side wrenches due to the lateral oscillation of the waves a cross-head D may be secured to its lower end, this cross-head being provided with friction-rollers $d$, adapted to travel on ways $d'$ on the piles. In the vertical movement of the piston-rod the cross-head traveling therewith will guide and securely hold the piston-rod in its proper relative position and prevent it from being bent or broken by the lateral oscillation of the waves.

The piston-rod and float should be coupled together in such a way that the spasmodic lateral motion of the float within the limits of the confining-piles will not affect the regular vertical motion of the piston-rod, and to accomplish this I provide a buffer E in general form like the frustum of a cone, the buffer being secured rigidly to the lower end of the piston-rod and having a flat horizontal ring $e$ around its downwardly-opening flared mouth. A spherical segment F is secured on the top of the float, with its center located at or near the center of figure of the float A, and the ring $e$ is adapted to engage and bear upon this spherical segment during the upward impulse of the waves. A chain $e'$ is secured to the lower end of the piston-rod $c$ and to a staple or other device secured to the float, this chain being provided with an open link or some other device whereby it can be readily reached through the opening $e''$ in the side of the buffer and uncoupled to release the float from the piston-rod. These parts are so designed because the center of figure of the float will also be approximately the center of lateral oscillation of the float and will tend to rise in a vertical line passing through the center of the space inclosed by the piles and therefore approximately through the axis of the piston-rod $c$. As a result of this arrangement the spherical bearing-surface of the segment, however presented within the limits of lateral oscillation, will be normal to the axis of the piston-rod and will tend to fit within the ring $e$, thereby affording an even bearing-surface. The chain connection between the piston-rod and the float permits of the float having a lateral oscillation without interfering with the regular vertical movement of the piston-rod.

On the upper end of the cylinder C a jacket G is shrunk or otherwise secured, and this jacket has an upward cylindrical extension $g$, which is threaded on its outer surface, for a purpose hereinafter described. A hollow piston-rod H operates in the jacket extension $g$, and projects at its lower end into the upper end of the cylinder C, carrying the piston $h$, which is provided with a valve $h'$, opening upwardly into the hollow piston and the valves $h''$ opening downwardly to permit air entering the space between the cylinder C and the hollow piston-rod H, through the openings $g'$, to pass into the space between the pistons $c'$ $h$.

The piston $h$ constitutes a movable head for the compressing-cylinder, and this head is actuated by the fluid between itself and the pressure-piston, and is controlled and regulated by the buffer to automatically adjust the head at the proper position.

The hollow piston-rod H carries a buffer-piston I on its upper end, which operates in a pneumatic buffer-cylinder $i$, suitably secured within the frame B. The area of this buffer-piston I should preferably be greater than the area of the piston $c'$ by a sufficient amount to make the total air-pressure on the buffer-piston sufficient to resist the tendency of the hollow piston-rod to rise until the piston $c'$ has come in contact, or approximately so, with the piston $h$.

A screw-wheel J is arranged on the extension $g$, and in a circular recess $j$ in the upper part of said wheel is fitted a ring $j'$ supported on spring-buffers $j''$ and supporting the cylinder K, which is arranged within the pneumatic buffer-cylinder and in turn supports the buffer-piston. Ball-bearings may be provided between the yieldingly-supported ring $j'$ and the supporting-cylinder K to facilitate the adjustment of the screw-wheel J.

The upper end of the pneumatic buffer-cylinder is connected by a pipe $k$ with the pressure-chamber L, which is provided in order that the working pressure of the wave-motor may be regulated or maintained at a constant pressure, the object being to reduce within certain limits the height of the stroke of the piston-rod $c$ by increasing the pressure required to open the valve $h'$, thereby increasing the submergence of the float and shortening the stroke of the piston-rod $c$ by the same amount. The pressure-chamber communicates with the conduit or receiver M through a pipe $l$, which is provided with a pressure-valve $l'$, Fig. 6, opening outward from the pressure-chamber and capable of being so adjusted that a greater or less pressure is required to force it open. Various forms of valves may be provided in the pipe $l$ to accomplish the ends sought; but in the drawings I have shown an ordinary form of safety-valve, the valve-stem $m$ passing freely through a shoulder $m'$ on the pipe $l$ and also through a thumb-screw N, adjustably secured in said shoulder and adapted to increase or decrease the tension of a spring $n$ within the shoulder and operating to hold the valve $m'$ normally seated. As the thumb-screw is adjusted outwardly, for example, the tension of the spring will be decreased and the valve $m'$ will therefore be pressed less tightly against its seat. The pressure-chamber is also provided with a pipe O, extending upwardly and provided with a valve $o$. When the valve $o$ is open, the working pressure within the chamber is reduced to a minimum and the float will rise to its maximum height for a given wave stroke. This valve is opened to bring the pressure-chamber into communication with the outside air when it is desired to uncouple the float and to lock the piston-rod $c$, as hereinafter described.

The operation of the parts hereinbefore described will be generally understood; but I will now proceed to give a brief description thereof as follows: The piston $c'$ is impelled to rise and fall by the wave-actuated float, and when it approaches sufficiently close to the piston $h$ so that the air-pressure between these pistons will open the valve $h'$ the piston $c'$ will force air through the hollow piston-rod H and the pipe K into the pressure-chamber L and air-receiver M. As the piston $c'$ drops, the pressure under the piston $h$ becomes less than the atmospheric pressure, which causes the valve $h''$ to open and admit fresh air, which has entered through openings $g'$ into the space between the piston $c'$ $h$. If an occasional high wave pushes the piston $c'$ into a position higher than that indicated in Fig. 4, this piston will be lifted against the pressure on the buffer-piston I and will return to its present position as the wave recedes. It cannot fall lower than that position, because the buffer-piston rests on the supporting-cylinder K, which in turn rests upon the screw-wheel J.

If the energy of the waves diminishes, the machine will probably cease to store compressed air in the present position of the buffer-piston, because the pressure above the piston $c'$ will be insufficient to open the valve $h'$. To adjust the apparatus to meet this new condition, the supporting-cylinder K is lowered by operating the screw-wheel J until it arrives at the desired position. The most desirable position with respect to a given series of waves may be determined very easily after a little experience. If the piston $h$ is only lowered to meet the highest waves of the series, manifestly much of the energy of the shorter waves will be lost, and if the piston is lowered to meet the shortest waves a considerable portion of the energy of the highest waves will be expended in wasteful work on the buffer; but a mean where the machine will develop its maximum efficiency can be readily ascertained to meet the various conditions that may exist by careful attention to the adjustment.

If we suppose that with a given pressure in the pressure-chamber the piston $c'$ rises to the approximate position indicated by the dotted lines $y\,y$ of Fig. 1 and that the waves are gradually rising in height, then the upward limit of the stroke may still be maintained by gradually increasing the pressure required to open the valve $l'$, for as the working pressure increases the submergence of the float at the top of its stroke must also increase. Whenever the pressure in the pressure-chamber L exceeds the desired pressure, a portion of the confined air therein will escape into the conduit or air-receiver M until an equilibrium is again restored in the pressure-chamber. Conversely, to work with low waves the submergence of the float and the consequent working pressure must be decreased.

The location of the openings $g'$ and the pressure-chamber L and the other parts of the apparatus with relation to each other may be changed and varied without departing from my invention.

In Fig. 5 I have shown the mechanism by means of which the motor may be stopped and thrown out of gear, and referring particularly to this figure P designates a hollow perforated plug fitting in a recess at the bottom of the air-compressing cylinder C and held in place by the ring $p$, which is suitably secured to said cylinder. This plug is provided with a downward extension $p'$, which forms a guide-tube for the piston-rod $c$, and on its outer surface is cut a thread to receive the screw-wheel Q. The sealing-plate R rests upon the screw-wheel Q, and it is adapted to be forced against the ring $p$ to seal the lower end of the cylinder C. Ball-bearings may be provided between the seal-plate R and the screw-wheel Q, and the seal-plate may also be provided with a facing $r$ of rubber or other suitable material. A pipe or hose S connects the lower end of the cylinder C with the air-receiver, and this pipe is provided with a valve $s$. A collar T is secured to the frame B and around the piston-rod $c$ beneath the screw-wheel Q, and an adjusting-screw $t$ operates in said collar and is adapted to be forced into the groove $t''$, which groove is cut deeper at its lower part than at its upper part and is inclined to the axis of the piston-rod. The operation of this stopping mechanism is as follows: The connection between the piston-rod and the float having been broken, if the piston is then pushed upward by the upward impulse of the wave it will remain in an elevated position due to friction and the difference of pressure between its upper and lower surface. However, if its comparatively light weight moves it downward it will descend slowly until it receives an impulse from the next wave. This mechanism is designed to lift the piston to its highest position in the cylinder, where it will be out of reach of the float. To do this, the screw-wheel Q is turned until the plate R is brought tightly against the ring $p$, thus sealing the cylinder. On the first downward stroke of the piston thereafter the air under the piston will be confined and an air-cushion formed thereby, and the piston arrested in its fall at some point above the normal limit of its stroke. If air is then admitted under pressure from the receiver through the pipe S, the piston will gradually rise, and when the groove $t''$ comes opposite the collar the screw $t$ may be adjusted to lock the piston in this position and the compressed-air supply cut off by means of the valve $s$. When the operative mechanism is disconnected from the float and turned into a safe position, as hereinbefore described, it is also desirable to submerge the float to protect it from the force of the waves or for other reasons, and to this end I have designed a peculiar form of float, which is provided, as shown in Fig. 1, with a neck U in its lower side opening downwardly, this neck being provided to diminish the chance of air escaping from beneath the float during any lateral oscillation of the float, which would thereby tend to cause the float to sink. This float is connected by a pipe or hose $u$ with the receiver. If this float be placed in the water with the neck down and the stop-cock $u'$ closed, the float will settle in the water until it displaces its own weight, the water rising in the neck of the float to the level indicated approximately in Fig. 1. Now if the stop-cock $u'$ is open, the air, being no longer confined, will escape from the float and the latter will be submerged, as it is heavier than the water. The float being submerged, if the upper end of the hose is coupled to the reservoir the air under pressure flowing from the reservoir into the float will force the water out of the float and cause the latter to rise.

Heretofore many different apparatus have been designed for the purpose of utilizing the energy of short waves; but my invention is particularly adapted for those waves that run in water of more or less depth and beyond the short waves. By utilizing these waves I am enabled to recover a great amount of power, which can be transmitted in the form of compressed air through conduits or otherwise to a distributing-point, or dynamos or engines may be located convenient to the apparatus and run by power developed by said apparatus and the power of these machines transmitted to points where it can be utilized. This apparatus obviates the dangers incident to these heavy oscillating waves, for it is to a large extent automatic in its action, as the air-cushion formed above the buffer-piston and the pressure-chamber will prevent the pressure-piston $c'$ from rising with such unrestrained force by reason of the impulse of the wave communicated to the float as to strike and injure the piston $h$ and its connected parts. However, by a simple adjustment of the screw-wheel J such an increased energy in the force of the waves can be utilized, and likewise by another adjustment of the screw-wheel the full force of a shorter wave of less energy can be utilized. Should the force of the waves become so great that there is danger of injuring the apparatus, the coupling between the piston-rod $c$ and the float can be disengaged, the pressure apparatus swung into a horizontal position, and the float sunk, as hereinbefore described, the various connections between these parts being effected by hose or other form of flexible pipe for this purpose. If the float is cylindrical in form, the coupling is such as will permit of a more or less circular movement thereof, and as the float moves in a vertical direction freely and easily the consequent lateral oscillation of whatever extent possible is provided for by the peculiar coupling, as the spherical segment F will always engage the ring $e$ on the buffer E.

I have described and illustrated my improved mechanism as constructed and adapted for the purpose of compressing air; but it is obvious that the same apparatus can be employed for the purpose of forcing gas, water, or other fluids into a conduit or receiver in the same manner as I have described herein, with only such changes and modifications as will occur to a skilled mechanic.

Having thus fully described my invention, what I claim, and desire to secure by Letters Patent, is—

1. In a wave-power, the combination with a movable float, of a pressure-cylinder, a movable head for said cylinder, a pressure-piston operating in said cylinder and adapted to be actuated by the float, a conduit or receiver, a buffer arranged intermediate of the pressure-piston and the conduit or receiver and means for maintaining a supply of fluid in said buffer to control the operation of the pressure-piston, substantially as described.

2. In a wave-power, the combination with a movable float, of a pressure-cylinder, a pressure-piston operating in said cylinder and adapted to be actuated by the float, a conduit or receiver, a buffer located intermediate of the pressure-piston and the conduit or receiver and a pressure-valve arranged between the buffer and the conduit or receiver to maintain a constant supply of fluid in the buffer, substantially as described.

3. In a wave-power, the combination with a movable float, of a pressure-cylinder, a pressure-piston operating in said cylinder and adapted to be actuated by the float, a conduit or receiver, a buffer-cylinder located intermediate of the pressure-piston and the conduit or receiver, a chamber connected with the buffer-cylinder and the conduit or receiver and a pressure-valve between said chamber and a conduit or receiver, substantially as described.

4. In a wave-power, the combination with a movable float, of a pressure-cylinder, a pressure-piston operating in said cylinder and adapted to be actuated by the float, a buffer-cylinder, a buffer-piston operating in said buffer-cylinder, a piston-rod for said buffer-piston having its lower end in the pressure-cylinder and a conduit or receiver, substantially as described.

5. In a wave-power, the combination with a movable float, of a pressure-cylinder, a pressure-piston operating therein and adapted to be actuated by the float, a buffer-cylinder, a buffer-piston rod carrying pistons on each end operating, respectively, in the pressure-cylinder and the buffer-cylinder, and a conduit or receiver, substantially as described.

6. In a wave-power, the combination with a movable float, of a pressure-cylinder, a pressure-piston operating in said cylinder, a buffer-cylinder, a buffer-piston rod carrying pistons on each end adapted to be operated, respectively, in the pressure-cylinder and the buffer-cylinder, means for adjusting said pistons in said cylinders and a conduit or receiver, substantially as described.

7. In a wave-power, the combination with a movable float, of a pressure-cylinder, a pressure-piston operating in said cylinder and adapted to be actuated by the float, a buffer-cylinder, a buffer-piston rod carrying pistons on its ends operating, respectively, in the pressure-cylinder and the buffer-cylinder, means for limiting the downward movement of said piston-rod and its pistons and a conduit or receiver, substantially as described.

8. In a wave-power, the combination with a movable float, of a pressure-cylinder, a pressure-piston operating in said cylinder and adapted to be actuated by the float, a buffer-cylinder, a buffer-piston rod carrying pistons on its ends adapted to operate, respectively, in the pressure-cylinder and the buffer-cylinder, means for adjusting the buffer-piston rod and its pistons in said cylinders, means for limiting the downward movement of the buffer-piston and its pistons, and a conduit or receiver, substantially as described.

9. In a wave-power, the combination with a movable float, of a pressure-cylinder, a pressure-piston operating in said cylinder and adapted to be actuated by the float, a buffer-cylinder, a buffer-piston rod carrying pistons on its ends adapted to operate, respectively, in the pressure-cylinder and the buffer-cylinder, means for controlling the movement of said piston-rod and its pistons to control the movement of the pressure-piston, and a conduit or receiver, substantially as described.

10. In a wave-power, the combination with a movable float, of a pressure-cylinder, a pressure-piston operating in said cylinder and adapted to be actuated by the float, a buffer-cylinder, a buffer-piston rod carrying pistons on its ends adapted to operate, respectively, in the pressure-cylinder and the buffer-cylinder, means for regulating a supply of fluid in the buffer-cylinder to control the operation of the pressure-piston, and a conduit or receiver, substantially as described.

11. In a wave-power, the combination with a movable float, of a pressure-cylinder, a pressure-piston operating in said cylinder and adapted to be actuated by the float, a buffer-cylinder, a buffer-piston rod carrying pistons on its ends adapted to operate, respectively, in the pressure-cylinder and the buffer-cylinder, a supporting-cylinder held within the buffer-cylinder and adapted to limit the downward movement of the buffer-piston and piston-rod, and a conduit or receiver, substantially as described.

12. In a wave-power, the combination with a movable float, of a pressure-cylinder, a pressure-piston operating in said cylinder and adapted to be actuated by the float, a buffer-cylinder, a buffer-piston rod carrying pistons on its ends adapted to operate, respectively, in the pressure-cylinder and the buffer-cylinder, a supporting-cylinder arranged within the buffer-cylinder to limit the downward movement of the buffer-piston and piston-rod and means for adjusting said supporting-cylinder, substantially as described.

13. In a wave-power, the combination with a movable float, of a pressure-cylinder, a pressure-piston operating in said cylinder and adapted to be actuated by the float, a buffer-cylinder, a jacket secured on the pressure-cylinder and having an upward hollow extension provided with an exterior thread, a buffer-piston rod carrying pistons on its ends adapted to operate, respectively, in said pressure and buffer cylinders and passing through said extension, a supporting-cylinder arranged within the buffer-cylinder and adapted to limit the downward movement of the buffer-piston and piston-rod, and a screw-wheel operating on the threaded extension and supporting the supporting-cylinder, substantially as described.

14. In a wave-power, the combination with a movable float, of a pressure-cylinder, a pressure-piston operating in said cylinder and adapted to be actuated by the float, a buffer-cylinder, a jacket secured on the pressure-cylinder and provided with a hollow extension having an exterior thread, a buffer-piston rod operating in said extension and having pistons on its ends adapted to operate, respectively, in the pressure-cylinder and buffer-cylinder, a supporting-cylinder located beneath the piston on the upper end of the buffer-piston rod and adapted to limit the downward movement of the piston-rod, a screw-wheel arranged on said threaded extension and having a recess in its upper side, spring-buffers in said recess, and a ring supported on said buffer and carrying the supporting-cylinder, substantially as described.

15. In a wave-power, the combination with a movable float, of a pressure-cylinder, a pressure-piston operating in said cylinder and adapted to be actuated by the float, a buffer-cylinder, a hollow piston-rod carrying pistons on its ends adapted to operate, respectively, in the pressure and buffer cylinders, the piston on the lower end of said buffer-piston being provided with a valve opening upward into the piston-rod and with valves around said piston-rod opening downward, the pressure-cylinder being provided with inlet-openings at its upper end, and means for controlling the supply of fluid above the piston on the lower end of said piston-rod, substantially as described.

16. In a wave-power, the combination with a movable float, of a pressure-cylinder, a pressure-piston operating in said cylinder and adapted to be actuated by the float, a buffer-cylinder, the pressure-cylinder being provided with inlet-openings at its upper end, a jacket secured on the upper end of said cylinder provided with a hollow exteriorly-threaded extension, a hollow piston-rod operating in said extension and carrying pistons on its ends adapted to operate, respectively, in the pressure and buffer cylinders, the piston on the lower end of said piston-rod being provided with a valve opening upward into the piston-rod and valves around said piston-rod opening downward, a screw-wheel arranged on said upward extension and a cylinder carried by said screw-wheel and supporting the buffer-piston rod and its pistons, substantially as described.

17. In a wave-power, the combination with a movable float, of a pressure-cylinder, a pressure-piston operating in said cylinder and adapted to be actuated by the float, a buffer-cylinder, a hollow piston-rod carrying pistons on its ends adapted to operate, respectively, in the pressure and buffer cylinders, a chamber connecting with the buffer-cylinder, a conduit or receiver, a pipe connecting said chamber to the conduit or receiver and a valve located in said pipe and adapted to regulate the supply of fluid between itself and the piston on the lower end of the buffer-piston rod, substantially as described.

18. In a wave-power, the combination with a movable float, of a pressure-cylinder, a pressure-piston operating in said cylinder and adapted to be actuated by the float, a buffer-cylinder, a hollow buffer-piston rod carrying pistons on its ends adapted to operate, respectively, in the pressure and buffer cylinders, the piston on the lower end of said piston-rod being provided with valves opening upwardly and downwardly, and means for maintaining a sufficient supply of fluid above the upwardly-opening valve in the lower piston and above the upper piston on said piston-rod, substantially as and for the purpose described.

19. In a wave-power the combination with a movable float, of a pressure-cylinder, a piston operating in said pressure-cylinder, a conduit or receiver to receive the fluid forced therein by the pressure-piston and means for holding said pressure-piston in an elevated position by fluid-pressure beneath the piston to stop its operation, substantially as described.

20. In a wave-power, the combination with a movable float, of a pressure-cylinder, a piston operating in said pressure-cylinder, a conduit or receiver to receive the fluid forced therein by the pressure-piston, means for sealing the lower end of the pressure-cylinder and means for supplying fluid from the conduit or receiver to the lower end of the cylinder to hold the pressure-piston in an elevated position, substantially as described.

21. In a wave-power, the combination with a movable float, of a pressure-cylinder, a piston operating in said pressure-cylinder, a conduit or receiver to receive the fluid forced therein by the pressure-piston, a plug in the lower end of the pressure-cylinder having a downward extension provided with an exterior thread, a sealing-plate, a screw-wheel operating on said threaded extension and adapted to force said sealing-plate against the lower end of the pressure-cylinder, a conduit or receiver and means for supplying fluid from the conduit or receiver to the cylinder beneath the pressure-piston, substantially as and for the purpose described.

22. In a wave-power, the combination with a movable float, of a pressure-cylinder, a piston operating in said pressure-cylinder, a conduit or receiver to receive the fluid forced therein by the pressure-piston, a plug in the lower end of the pressure-cylinder provided with a downward extension adapted to form a guide-tube for the pressure-piston rod and exteriorly threaded, a ring secured to the end of the pressure-cylinder to hold said plug in place, a sealing-plate operating on the plug extension, a screw-wheel arranged on the threaded extension and adapted to force the sealing-plate against the ring on the lower end of the pressure-cylinder, a conduit or receiver adapted to receive the fluid forced therein from the pressure-piston, a pipe leading from said conduit or receiver to the lower end of the pressure-cylinder beneath the plug and a valve in said pipe, substantially as and for the purpose described.

23. In a wave-power, the combination with a movable float, of a pressure-cylinder, a piston operating in said cylinder, a conduit or receiver to receive the fluid forced therein by the pressure-piston, a plug in the lower end of said pressure-cylinder having a downward extension adapted to form a guide-tube for the pressure-piston rod passing therethrough and exteriorly threaded, a sealing-plate, a screw-wheel operating in said threaded extension and adapted to force the sealing-plate against the lower end of the pressure-cylinder, a conduit or receiver, a pipe leading from said conduit or receiver to the lower end of the pressure-cylinder, a frame supporting said pressure-cylinder, a collar secured to said frame and encircling the pressure-piston rod, the piston-rod being provided with a groove cut therein, and an adjusting-screw operating in said collar and adapted to be adjusted into the groove in the piston-rod, substantially as described.

24. In a wave-power, the combination with a platform and a float, of a frame pivotally mounted on said platform and compressing mechanism carried by said frame and adapted to be connected to and actuated by said float, substantially as described.

25. In a wave-power, the combination with a platform and a movable float, of compressing mechanism connected to and adapted to be actuated by said float and a frame supporting said mechanism, said frame being movably mounted on said platform, substantially as and for the purpose described.

26. In a wave-power, the combination with a platform, of piles supporting the same and provided with ways thereon, a float operating between said piles, of compressing mechanism supported on said platform, a piston-rod connected to said float and forming a part of said compressing mechanism, a cross-head secured on the lower end of said piston-rod and provided with friction-rollers adapted to engage the ways on the piles and a buffer intermediate of the float and piston-rod, substantially as and for the purpose described.

27. In a wave-power, the combination with a float, of compressing mechanism adapted to be actuated by the float, a piston-rod forming a part of said compressing mechanism, a buffer secured to the lower end of said piston-rod, a spherical segment secured on the top of the float, and a flexible connection between said piston-rod and float, substantially as described.

28. In a wave-power, the combination with a float, of a piston-rod, a buffer secured to the end of said piston-rod and having a flat horizontal ring around its downwardly-opened flared mouth, a spherical segment secured on the top of the float and a flexible connection between the piston-rod and float adapted to connect the parts in such relative position that the segment on the float will always engage the buffer on the piston-rod whenever the float rises sufficiently to actuate the piston-rod, substantially as described.

29. In a wave-power, the combination with a movable float, of a pressure-cylinder, a pressure-piston operating therein and adapted to be actuated by the float, a buffer-cylinder, a buffer-piston carrying pistons on its ends adapted to operate, respectively, in the pressure-cylinder and the buffer-cylinder, a conduit or receiver, and a connection between the pressure-cylinder and the conduit or receiver, substantially as described.

30. In a wave-power, the combination with a movable float, of a pressure-cylinder, a pressure-piston operating therein and adapted to be actuated by the float, a buffer-cylinder, a buffer-piston rod carrying pistons on its ends adapted to operate, respectively, in the pressure-cylinder and the buffer-cylinder, an air conduit or receiver, a connection between the pressure-cylinder and the air conduit or receiver to form an outlet for the air from the pressure-cylinder and a connection between the buffer-cylinder and the pressure-cylinder outlet, substantially as and for the purpose described.

31. In a wave-power, the combination with a movable float, of a pressure-cylinder, a movable head for said pressure-cylinder, a buffer-cylinder connected with said pressure-cylinder, a conduit or receiver and means actuated by the float for forcing fluid from the pressure-cylinder through the buffer-cylinder to the air conduit or receiver, substantially as described.

32. In a wave-power, the combination with a movable float, of a pressure-cylinder, a buffer-cylinder connected with said pressure-cylinder, a conduit or receiver, a pressure-piston operating in said pressure-cylinder and adapted to be actuated by the float to force fluid from the pressure-cylinder through the buffer-cylinder to the conduit or receiver and a buffer located above said pressure-piston, substantially as and for the purpose described.

33. In a wave-power, the combination with a movable float, of a pressure-cylinder, a pressure-piston operating in said cylinder and adapted to be actuated by the float, a vertically-movable piston constituting an adjustable head for said pressure-cylinder, a conduit or receiver, a buffer arranged intermediate of the pressure-piston and the conduit or receiver and adapted to control the adjustable head, and means for maintaining a supply of fluid in said buffer, substantially as and for the purpose described.

34. In a wave-power, the combination with a movable float, of a pressure-cylinder having an adjustable head, a conduit or receiver and a buffer located intermediate of the conduit or receiver and the pressure-cylinder and adapted to control and regulate the movement of said adjustable head, substantially as described.

35. In a wave-power, the combination with a float, of a piston-rod, a chain connecting the end of the piston-rod to the float, a spherical segment on the top of said float around the chain, and a buffer secured on the lower end of the piston-rod around the chain and having a downwardly-opened flared mouth, substantially as and for the purpose described.

36. A float for wave-powers having its lower side provided with a downwardly-extending open neck of less diameter than the diameter of the float and opening into and forming a continuation of the float, substantially as described.

JOHN McAULEY PALMER.

Witnesses:
W. T. MAY,
CHARLES T. BOYD.